United States Patent
Tahara et al.

(10) Patent No.: US 11,134,816 B2
(45) Date of Patent: Oct. 5, 2021

(54) DUST COLLECTOR

(71) Applicant: MAKITA CORPORATION, Anjo (JP)

(72) Inventors: Takayuki Tahara, Anjo (JP); Keisuke Yamada, Anjo (JP)

(73) Assignee: MAKITA CORPORATION, Anjo (JP)

( * ) Notice: Subject to any disclaimer, the term of this patent is extended or adjusted under 35 U.S.C. 154(b) by 135 days.

(21) Appl. No.: 15/880,469

(22) Filed: Jan. 25, 2018

(65) Prior Publication Data

US 2018/0235419 A1  Aug. 23, 2018

(30) Foreign Application Priority Data

Feb. 17, 2017 (JP) .............................. JP2017-028275

(51) Int. Cl.
- *A47L 9/00* (2006.01)
- *A47L 9/10* (2006.01)
- *A47L 9/12* (2006.01)
- *A47L 9/14* (2006.01)
- *A47L 9/16* (2006.01)

(52) U.S. Cl.
CPC ............. *A47L 9/102* (2013.01); *A47L 9/0081* (2013.01); *A47L 9/122* (2013.01); *A47L 9/1409* (2013.01); *A47L 9/1666* (2013.01); *B01D 2275/202* (2013.01); *B01D 2279/55* (2013.01)

(58) Field of Classification Search
CPC ........ A47L 9/0081; A47L 9/102; A47L 9/122; A47L 9/1409; A47L 9/1666; B01D 2275/202; B01D 2275/55
See application file for complete search history.

(56) References Cited

U.S. PATENT DOCUMENTS

| | | | | |
|---|---|---|---|---|
| 2,393,419 A | * | 1/1946 | Schaaf | B01D 46/10 52/658 |
| 2,522,882 A | * | 9/1950 | Lofgren | A47L 9/20 55/293 |
| 2,627,937 A | * | 2/1953 | Martinet | A47L 9/122 55/372 |

(Continued)

FOREIGN PATENT DOCUMENTS

| | | | | |
|---|---|---|---|---|
| JP | 5543751 B1 | * | 5/2004 | ............. B01D 46/52 |
| JP | 2005-177640 A | | 7/2005 | |

(Continued)

OTHER PUBLICATIONS

Sep. 29, 2020 Office Action issued in Japanese Patent Application No. 2017-028275.

(Continued)

*Primary Examiner* — Joseph J Hail
*Assistant Examiner* — Arman Milanian
(74) *Attorney, Agent, or Firm* — Oliff PLC (57) ABSTRACT

A dust collector includes a tank, a main body, a suction fan, a flexible pre-filter, and a main filter. The tank includes a suction opening. The main body is fixed to an upper portion of the tank. The suction fan is disposed at the main body. The suction fan is rotated by a motor. The flexible pre-filter is housed in the tank at a lower side of the main body. The pre-filter is positioned at an upstream side of external air suctioned from the suction opening. The main filter is positioned at a downstream side of the pre-filter. The main filter has a plate shape disposed laterally.

11 Claims, 12 Drawing Sheets

(56) References Cited

U.S. PATENT DOCUMENTS

| | | | | | |
|---|---|---|---|---|---|
| 3,358,316 | A | * | 12/1967 | Okun | A47L 9/20 15/352 |
| 3,457,707 | A | * | 7/1969 | Fesco | A47L 9/14 55/376 |
| 4,297,114 | A | * | 10/1981 | Hutchins | A47L 9/20 55/299 |
| 4,613,348 | A | * | 9/1986 | Natale | A47L 9/122 15/347 |
| 4,838,907 | A | * | 6/1989 | Perry | A47L 9/102 15/327.1 |
| 5,248,323 | A | * | 9/1993 | Stevenson | A47L 9/125 55/337 |
| 5,690,710 | A | * | 11/1997 | Stephan | B01D 46/0001 55/361 |
| 8,372,181 | B2 | * | 2/2013 | Davies | B01D 46/023 95/273 |
| 9,038,236 | B2 | * | 5/2015 | Fry | B01D 46/0075 15/352 |
| 2004/0168280 | A1 | * | 9/2004 | Wegelin | A47L 9/1481 15/347 |

FOREIGN PATENT DOCUMENTS

| | | | | |
|---|---|---|---|---|
| JP | 2008-188314 A | 8/2008 | | |
| JP | 2011-078887 A | 4/2011 | | |
| JP | 2013078703 A | 5/2013 | | |
| JP | 5603216 B2 | 10/2014 | | |
| JP | 5765175 B2 * | 8/2015 | | B01D 46/24 |
| JP | 2015-186780 A | 10/2015 | | |
| JP | 2015186780 A * | 10/2015 | | A47L 9/20 |
| JP | 2017056399 A * | 3/2017 | | B01D 46/24 |

OTHER PUBLICATIONS

Aug. 18, 2020 Office Action issued in Chinese Patent Application No. 201810077133.7.

Mar. 2021 Office Action issued in Chinese Patent Application No. 201810077133.7.

Dec. 22, 2020 Office Action issued in Chinese Patent Application No. 201810077133.7.

Jun. 2, 2021 Office Action issued in Chinese Patent Application No. 201810077133.7.

* cited by examiner

DUST COLLECTOR

BACKGROUND

This application claims the benefit of Japanese Patent Application Number 2017-028275 filed on Feb. 17, 2017, the entirety of which is incorporated by reference.

TECHNICAL FIELD

The disclosure relates to a dust collector in which a main body including a motor and a suction fan is placed upward of a tank with a suction opening and a filter is interposed between the suction opening and the main body inside the tank.

RELATED ART

A conventional dust collector has a main body which includes a motor and a suction fan placed upward of a tank with a suction opening, and a filter which is interposed between the suction opening and the main body inside the tank. That is, when the suction fan is rotated by driving the motor, external air is suctioned into the tank via a hose coupled to the suction opening and the external air is discharged to outside through the main body. Thus, dust suctioned into the tank together with the external air is captured by the filter and is accumulated in the tank. As disclosed in Japanese Patent No. 5603216, double filters including a main filter, which covers a peripheral area and a lower side of a suction port of a suction unit disposed at a main body, and a pre-filter, which covers the entire main filter outside the main filter, have been used. Here, dust suctioned from a suction opening into a tank is first captured by the pre-filter and is accumulated in the tank, and the main filter captures fine dust passing through the pre-filter.

The conventional dust collector includes the tubular main filter projecting downward from the main body to the inside of the tank and has a filter surface on the side outer circumference, and therefore, an amount of collecting dust in the tank is restricted. Meanwhile, in a case where a top-to-bottom dimension of the tank is increased to increase the amount of collecting dust, a top-to-bottom dimension of the entire dust collector is increased.

Therefore, an object of the disclosure is to provide a dust collector that ensures the compact entire top-to-bottom dimension while securing an amount of collecting dust inside the tank.

SUMMARY

In order to achieve the above-described object, there is provided a dust collector that includes a tank, a main body, a suction fan, a flexible pre-filter, and a main filter. The tank includes a suction opening. The main body is fixed to an upper portion of the tank. The suction fan is disposed at the main body. The suction fan is rotated by a motor. The flexible pre-filter is housed in the tank at a lower side of the main body. The pre-filter is positioned at an upstream side of external air suctioned from the suction opening. The main filter is positioned at a downstream side of the pre-filter. The main filter has a plate shape disposed laterally.

Here, "laterally" means a strict horizontal posture and may include a slight inclination. Additionally, the "plate shape" means a shape where the top and the lower surfaces and the side surfaces between the top and the lower surfaces are planar surfaces. Further, the "plate shape" may include a shape where the entire shape is a plate shape having a predetermined thickness even if each surface has, for example, slight unevenness and change in dimension. These meanings are also applied to the damper described later.

The main filter is preferably held by a holder which is supported inside the tank such that the entire main filter has a plate shape in a state of being folded multiple times in a predetermined direction.

Preferably, a damper is disposed between the pre-filter and the main filter and elastically deforms by contraction of the pre-filter when the external air is suctioned from the suction opening.

The damper preferably has a plate shape disposed laterally.

The dust collector preferably includes a damper restricting means that restricts at least a partial close contact of the damper with the main filter when the damper elastically deforms.

The damper restricting means is preferably disposed on a holder which supports the main filter.

The damper restricting means are preferably a plurality of restricting bosses which project downward below a lower filter surface of the main filter from a lower surface of the holder at positions surrounding the main filter.

The damper restricting means is preferably a tubular filter holder. Preferably, the tubular filter holder is formed on the holder to hold the main filter and projects downward below a lower filter surface of the main filter.

The dust collector preferably includes a pre-filter restricting means that restricts a close contact of the pre-filter with the main filter when the external air is suctioned from the suction opening.

The pre-filter restricting means is preferably disposed on the holder which supports the main filter.

The pre-filter restricting means are preferably a plurality of restricting bosses which project downward below a lower filter surface of the main filter from a lower surface of the holder at positions surrounding the main filter.

Preferably, the pre-filter is made of fiber where pleat portions are formed into a plurality of tiers in a vertical direction on an outer circumference. Further, the respective pleat portions are preferably partially fixed so that the pre-filter is suspended and supported in a state of being folded in the vertical direction.

The pleat portions are each preferably sewn in the vertical direction at a plurality of positions at a predetermined interval in a circumferential direction.

The pre-filter is preferably a bag whose opening is fixed to a frame, the frame configured to lock to an opening at a top surface of the tank.

The main filter is preferably made of a paper.

In order to achieve the above-described object, there is provided a dust collector that includes a tank, a main body, a suction fan, a flexible pre-filter, and a main filter. The tank includes a suction opening. The main body is fixed to an upper portion of the tank. The suction fan is disposed at the main body. The suction fan is rotated by a motor. The flexible pre-filter is housed in the tank at a lower side of the main body. The pre-filter is positioned at an upstream side of external air suctioned from the suction opening. The main filter is positioned at a downstream side of the pre-filter. The main filter has a rectangular shape in plan view.

With the embodiment, the main filter has the plate shape disposed laterally. Since this configuration decreases the volume that the filter occupies in the tank, the amount of collecting dust in the tank can be secured. Accordingly, the tank does not need to be larger in the vertical direction to secure the amount of collecting dust, thereby ensuring the compact entire top-to-bottom dimension.

DETAILED DESCRIPTION

Figure 1:
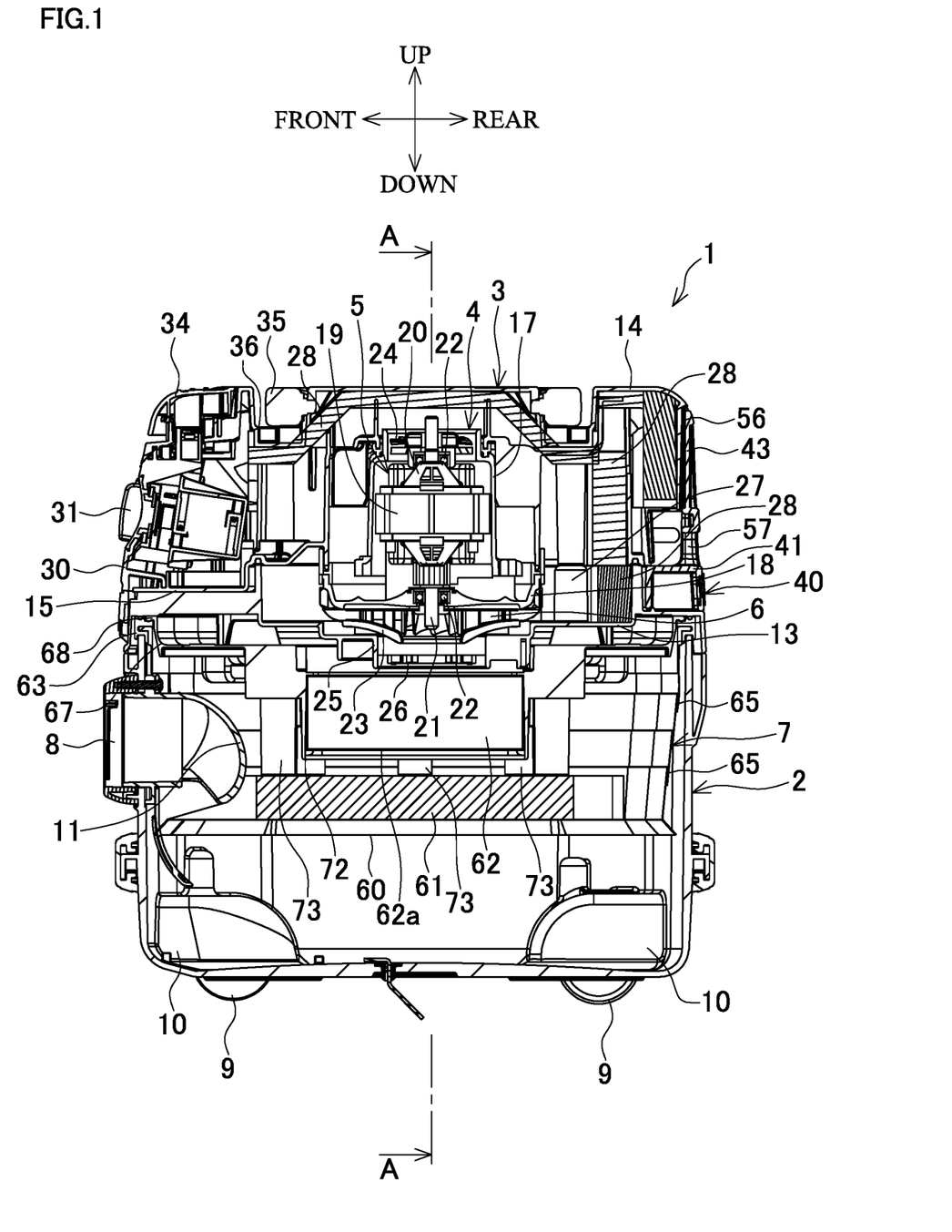
FIG. 1 is a center vertical cross-sectional view of a dust collector.
Figure 2:
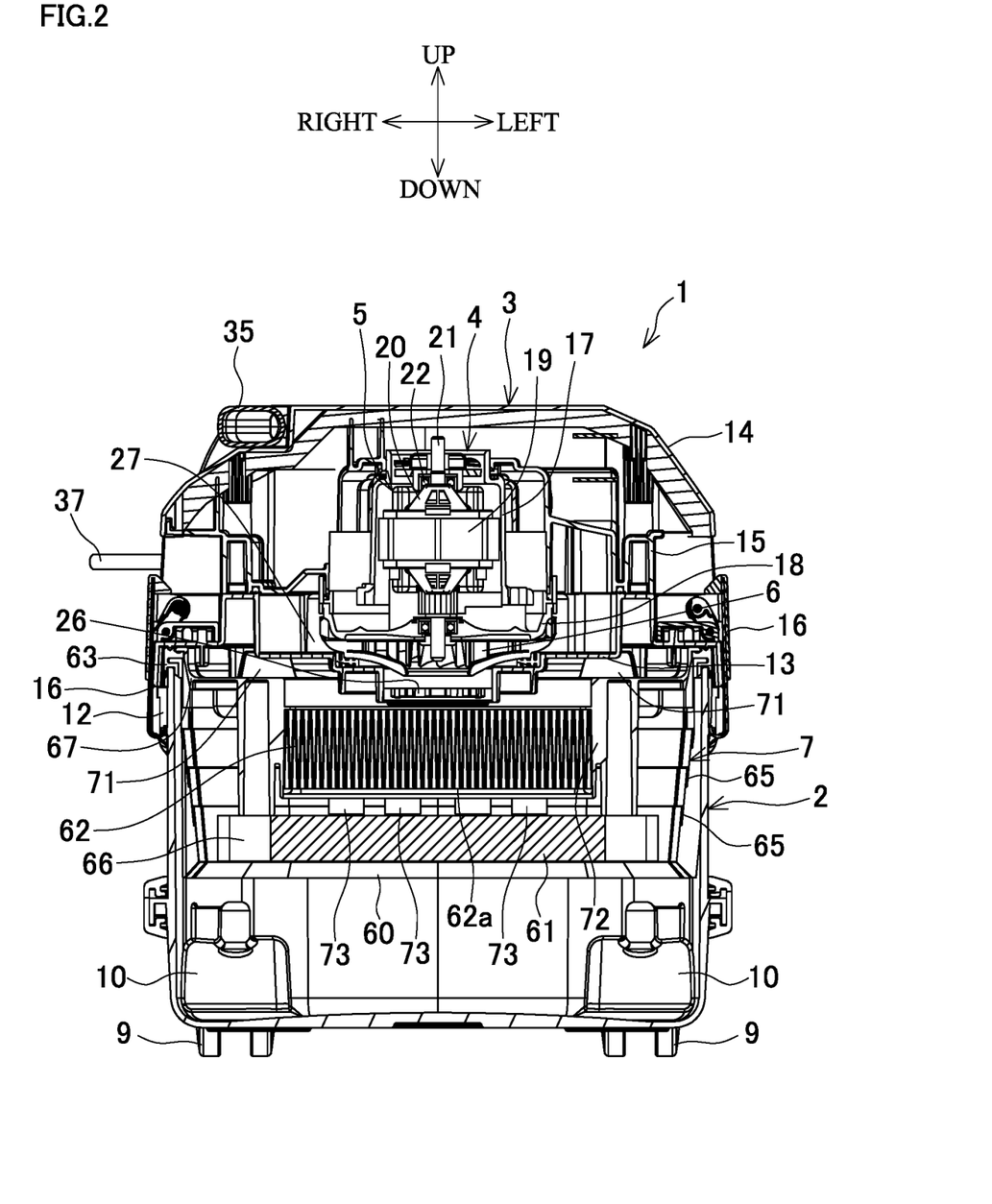
FIG. 2 is a cross-sectional view of a line taken along a line A-A in FIG. 1.
Figure 3:
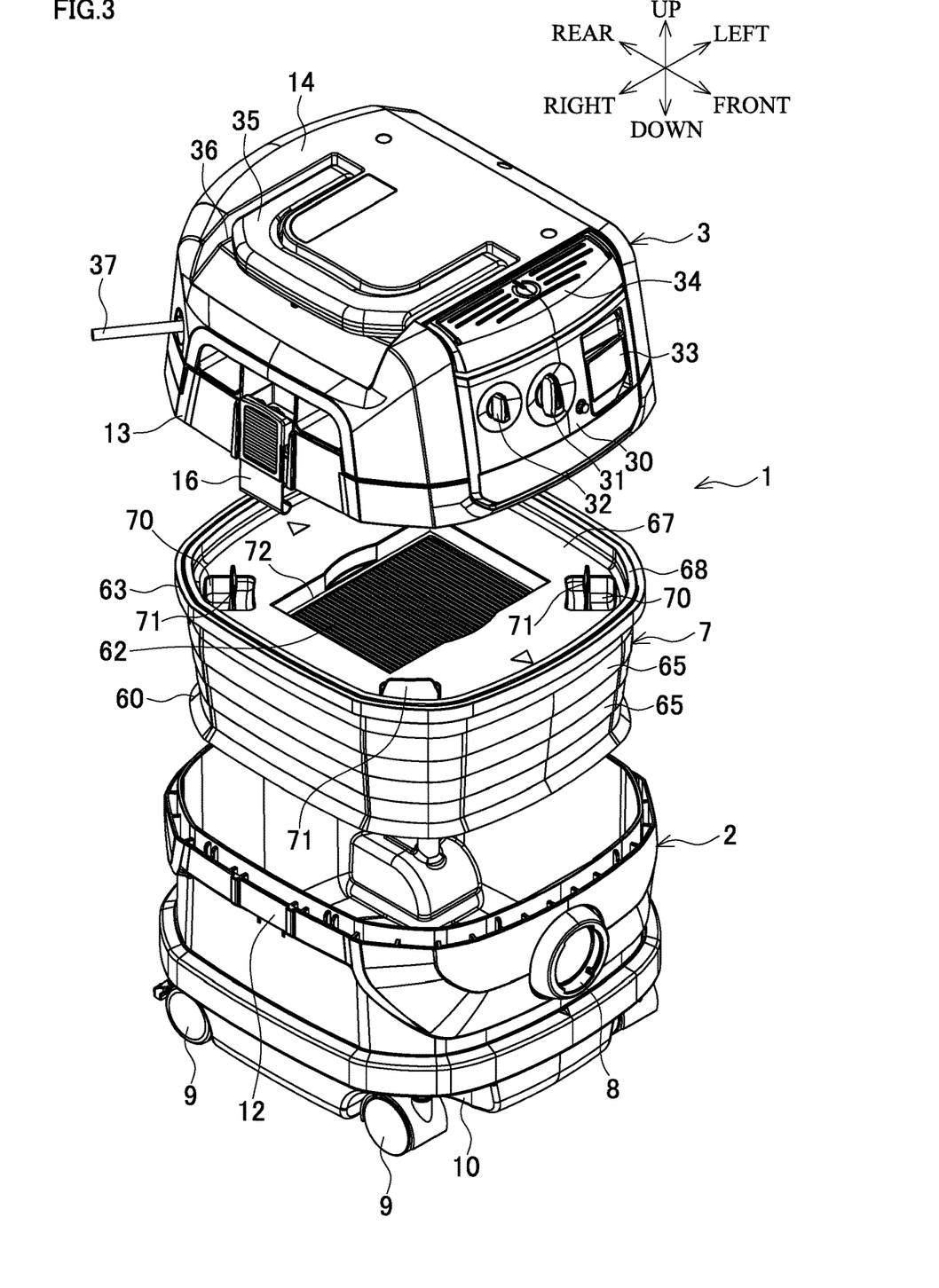
FIG. 3 is an exploded perspective view of the dust collector.

The following describes embodiments of the disclosure with reference to the drawings. FIG. 1 is a center vertical cross-sectional view illustrating one example of a dust collector, FIG. 2 is a cross-sectional view taken along a line A-A, and FIG. 3 is an exploded perspective view.

A dust collector 1 includes a main body 3, which houses a suction unit 4 including a motor 5 and a suction fan 6, placed upward a tank 2 with an open upper end and a filter assembly 7 between the tank 2 and the main body 3.

First, the tank 2 is a container with closed bottom having an approximately square shape in plan view. The tank 2 includes a suction opening 8 to which a hose (not illustrated) can be coupled on the front surface and one pair of casters 9 at each of the front and the rear on the lower portion (the casters 9 on the rear side include stoppers). The casters 9 are each supported inside depressed portions 10, which are disposed at four corners on the bottom surface of the tank 2. A guide pipe 11 to guide air suctioned into the tank 2 downward is mounted to the inside of the suction opening 8, and a lock flange 12 is disposed at an open peripheral edge on the tank 2.

The main body 3 includes a lower cowling 13, which closes the opening of the tank 2, an upper cowling 14, which is joined to the lower cowling 13 and covers the top surface and the peripheral surface of the main body 3, and a middle cowling 15, which is joined between the upper and the lower cowlings 13 and 14. Latches 16 are disposed at the right and the left of the lower cowling 13. While the filter assembly 7 is suspended and supported from the opening peripheral edge of the tank 2 to the inside of the tank 2, the latches 16 are locked to the lock flange 12 of the tank 2 to fix the main body 3 to the tank 2 together with the filter assembly 7.

The suction unit 4 includes a housing pipe 17 in a vertical direction supported by the middle cowling 15 at the approximately center of the main body 3, and a receiving cover 18, which is assembled to the lower side of the housing pipe 17, and the motor 5 is housed between the housing pipe 17 and the receiving cover 18.

The motor 5 includes a stator 19 fixed to the inside of the housing pipe 17 and a rotator 20 positioned at the center of the stator 19. An output shaft 21, which is disposed at the axial center of the rotator 20, is journaled downward by upper and lower bearings 22 disposed at the housing pipe 17 and the receiving cover 18.

The suction fan 6 is fixedly secured to the lower end of the output shaft 21 projecting from the receiving cover 18. The lower side of the suction fan 6 is covered with a baffle plate 23 except for the axial center on the suction side and the outer circumference on the exhaust side. A cooling fan 24 of the motor 5 is fixedly secured to the upper end of the output shaft 21.

A pipe portion 25 projecting downward at just below the baffle plate 23 is formed at the lower cowling 13, and a suction port 26 coaxial with the output shaft 21 is formed at the center of the pipe portion 25. A discharge path 27 open to outside is formed outside the suction fan 6 and between the lower cowling 13 and the middle cowling 15. Sound absorbing materials (sponges) 28 are used and are disposed at the opening of the discharge path 27 and the inner surface of the upper cowling 14.

A control panel 30 is disposed at the front surface of the main body 3. This control panel 30 includes a dial main power supply switch 31, a dial suction amount adjusting switch 32, and a coordinating electric outlet 33 with a cover for coupling of a power supply cord of an electric power tool such as a circular saw.

On the upper side of the control panel 30, a switch plate 34, which turns ON/OFF a switch (not illustrated) disposed at the back side of the control panel 30 to start/stop the operation, is disposed. When a pressing operation on the switch plate 34 is performed in a state where the main power supply switch 31 is ON, the motor 5 is driven. When the pressing operation is performed again, the motor 5 is stopped.

A handlebar 35 is disposed at the rear of the switch plate 34 and the top of the main body 3. The handlebar 35 with a U shape is fitted to a depressed portion 36, which has the identical shape and depressed on the top surface of the upper cowling 14. The handlebar 35 is rotatably coupled between a collapse position at which the handlebar 35 does not project from the top surface of the upper cowling 14 and a projection position at which the handlebar 35 projects from the top surface of the upper cowling 14 in the front-rear direction. A power supply cord 37 is extracted from a rear right side of the main body 3.

Figure 4:
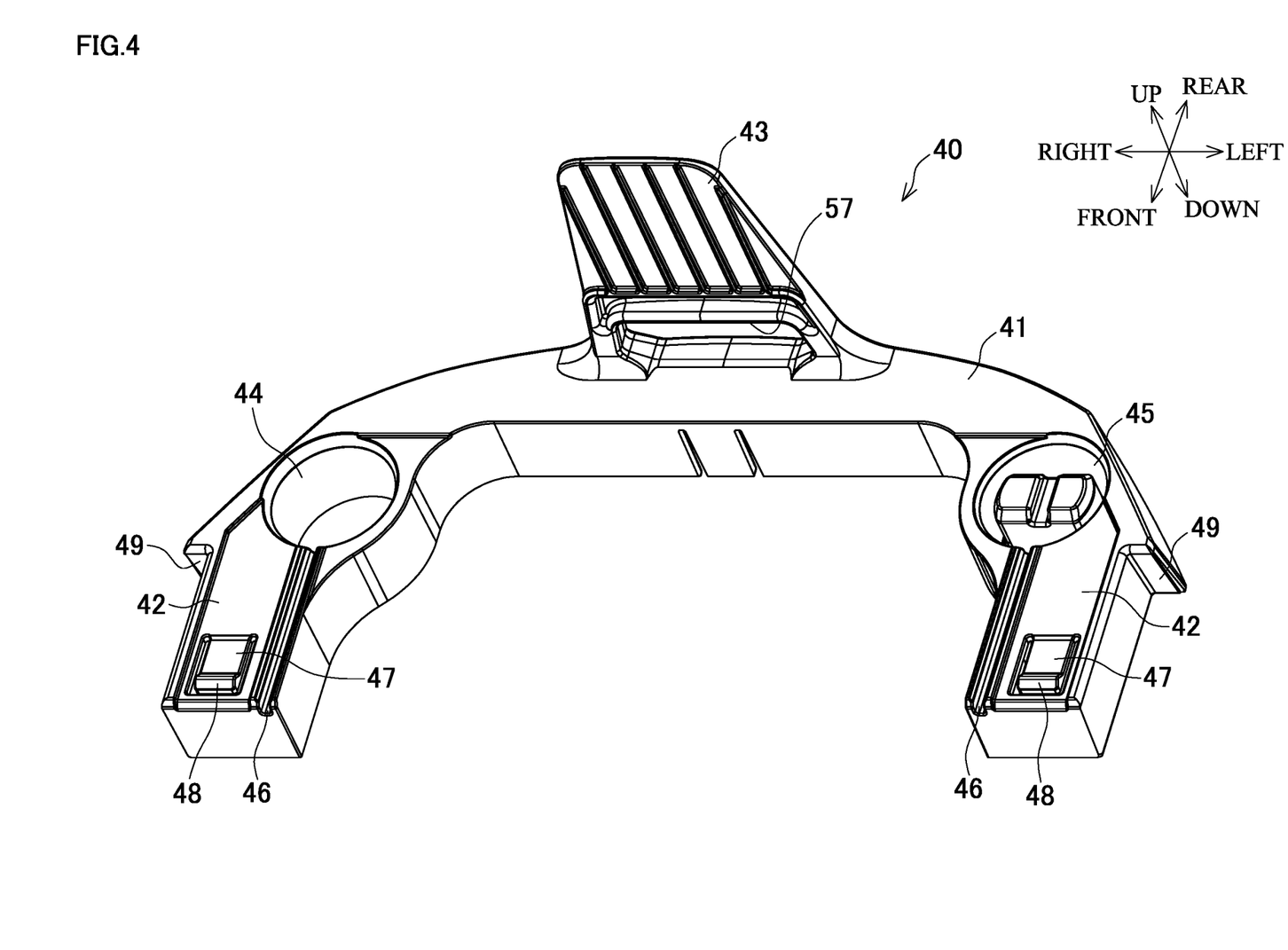
FIG. 4 is a perspective view of a hook plate.
Figure 5:
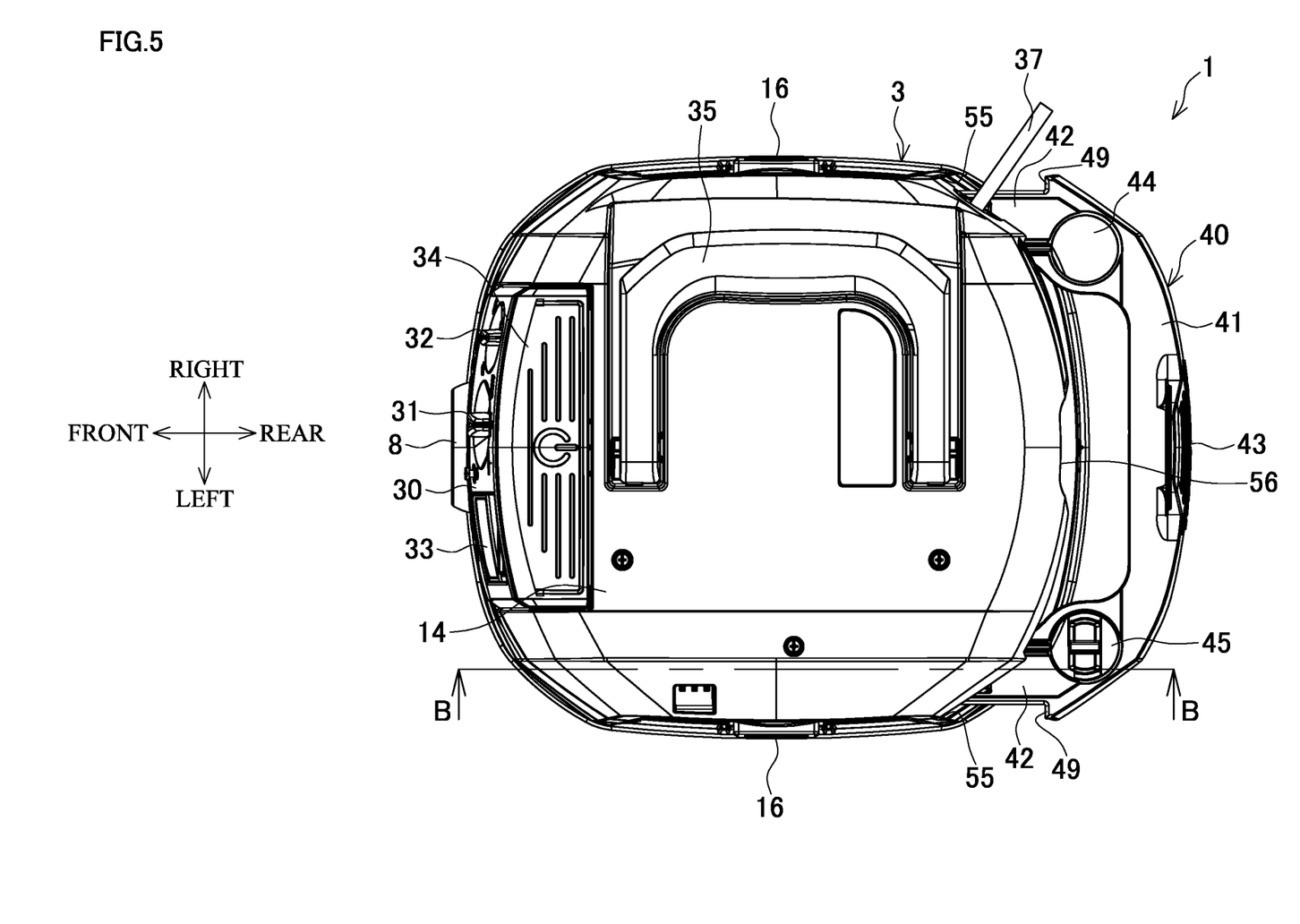
FIG. 5 is a plan view of the dust collector from which the hook plate is extracted.
Figure 6A:
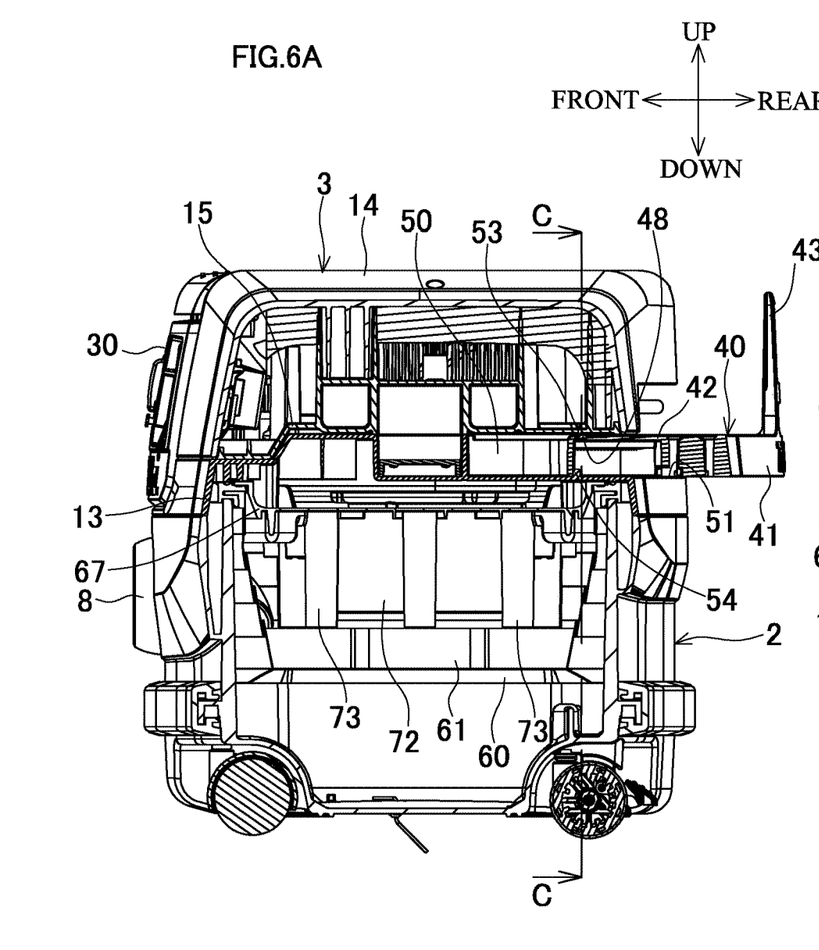
FIG. 6A is a cross-sectional view taken along a line B-B in FIG. 5.
Figure 6B:
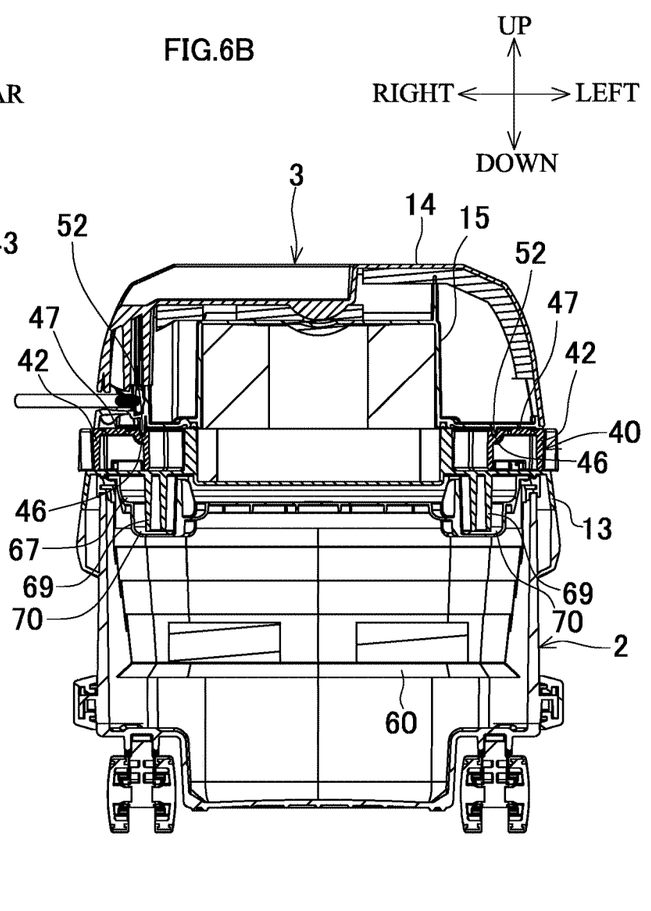
FIG. 6B is a cross-sectional view taken along a line C-C in FIG. 6A.

Furthermore, a hook plate 40 is disposed at the rear of the main body 3. As illustrated in FIG. 4, this hook plate 40 has a lateral plate portion 41 whose outer surface is formed along the plan view shape of the main body 3 and a pair of rail portions 42 extending from right and left ends of the lateral plate portion 41 forward. The hook plate 40 is made of resin whose top surface and peripheral walls formed at the peripheral edges are integrally formed and the lower surface is open.

At the center rear edge of the lateral plate portion 41, a hook 43 with a trapezoidal shape in back view protrudes upward. A right-side depressed portion 44 to which a hose can be inserted and fitted and a left-side depressed portion 45 to which a nozzle can be inserted and fitted are formed at joining portions between the lateral plate portion 41 and the right and the left rail portions 42.

The rail portions 42 each have a rail groove 46 in the front-rear direction at the top surface close to the center in the right-left direction. Elastic pieces 47, which include projections 48 in the right-left direction at the front ends and have elasticity in the vertical direction, are cut out at the edges of the front ends outside the rail portions 42. At outside of the rail portions 42, a stopper portion 49 projecting outward is each formed.

Meanwhile, as illustrated in FIG. 5 to FIG. 7B, insertion portions 50 in the front-rear direction and a fitting portion 51 in the right-left direction are formed between the lower cowling 13 and the middle cowling 15 on the main body 3 side. The rear ends of the insertion portions 50 are open and into which the right and left rail portions 42 are inserted. The fitting portion 51 is communicated between the rear ends of the right and the left insertion portions 50 and to which the lateral plate portion 41 is fittable. On the upper inner surface of the insertion portion 50, an engagement protrusion 52 in the front-rear direction, which engages with the rail groove 46 of the rail portion 42, and an upper stopper 53, which engages with the projection 48 of the rail portion 42 at the edge of the opening, are formed. Additionally, a lower stopper 54, which engages with the front end lower edge of the rail portion 42, is formed at the opening edge and the lower inner surface of the insertion portion 50.

Figure 7A:
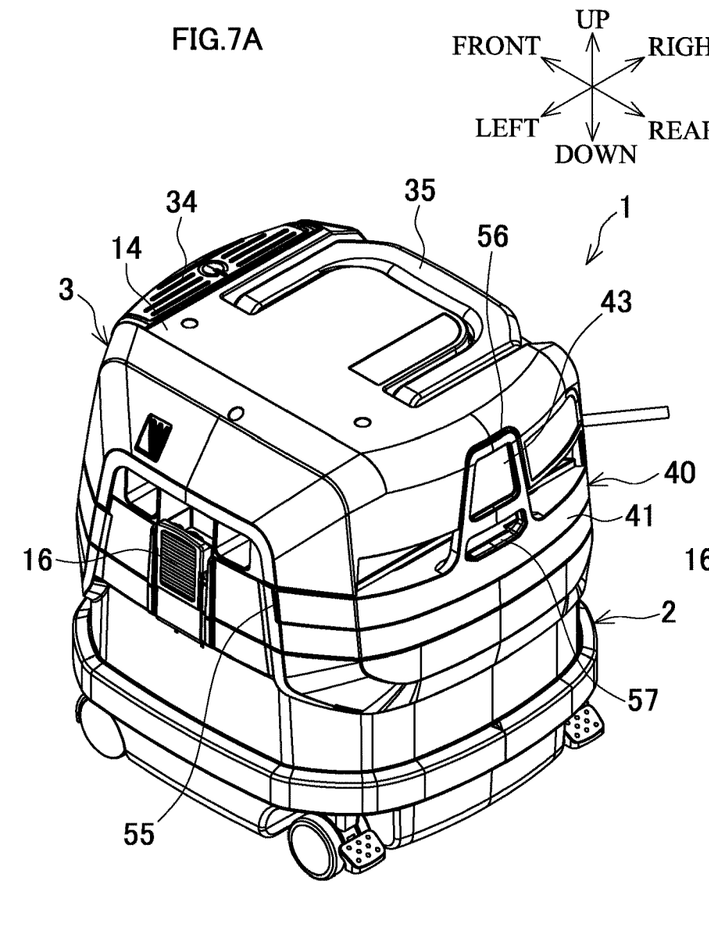
FIG. 7A is a perspective view of the dust collector housing the hook plate.
Figure 7B:
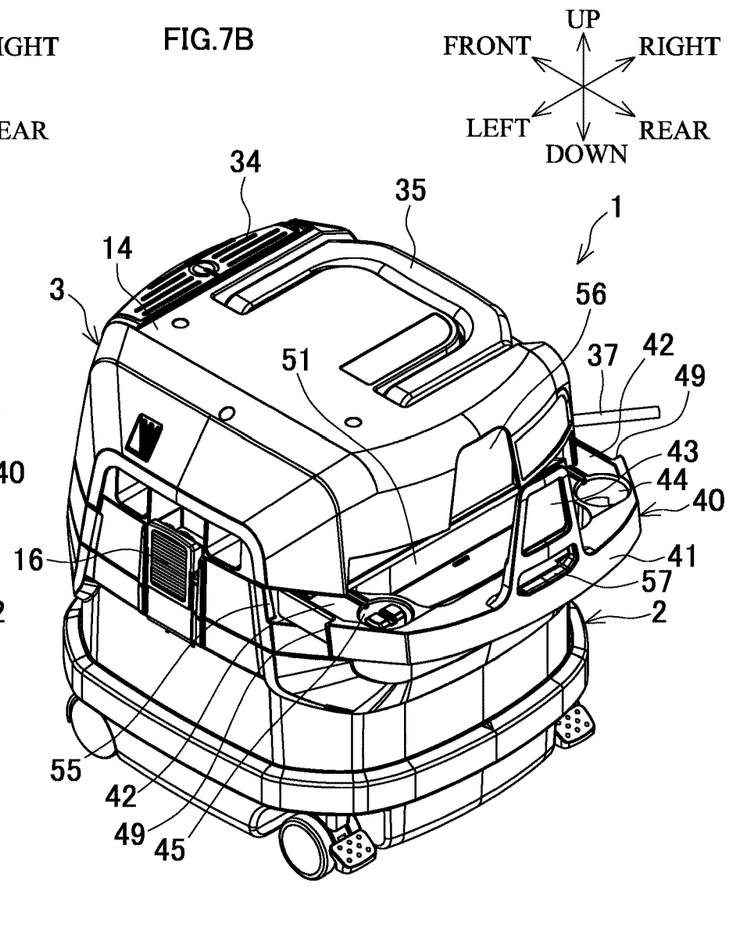
FIG. 7B is a perspective view of the dust collector from which the hook plate is extracted.

Accordingly, as illustrated in FIGS. 7A and 7B, when the rail portions 42 inserted into the respective insertion portions 50 are pushed forward, the stopper portions 49 of the rail portions 42 abut on stopper surfaces 55 which are disposed outside the opening of the insertion portion 50, thus the pushing of the hook plate 40 is restricted. In this state, the lateral plate portion 41 is fitted to the fitting portion 51 and is located at a housing position not projecting from the main body 3. A fitting depressed portion 56 to which the hook 43 is fitted is formed at the rear surface of the upper cowling 14 of the main body 3 such that the hook 43 also does not project from the rear surface of the main body 3 at the housing position.

As illustrated in FIGS. 5, 6A and 6B, and 7B, when the hook plate 40 is pulled rearward from this housing position using a finger hook hole 57 disposed at the base of the hook 43, the engagement protrusions 52, which engage with the rail grooves 46 of the rail portions 42, guide the hook plate 40. This configuration allows the hook plate 40 to be extracted up to a position where the projections 48 of the respective rail portions 42 go over the upper stopper 53 and the front ends of the respective rail portions 42 are locked to the lower stopper 54. At this extraction position, the hook 43 is away from the main body 3 rearward, and the right-side depressed portion 44 and the left-side depressed portion 45 are exposed to rearward of the main body 3 in plan view. Accordingly, the hose and the power supply cord 37 are hooked around the hook 43, and the hose is inserted into the right-side depressed portion 44 and the nozzle is inserted into the left-side depressed portion 45, respectively, to be housed. Since the projections 48 elasticity lock to the upper stopper 53 in the pushing direction at the extraction position, the extraction position is held.

Figure 8:
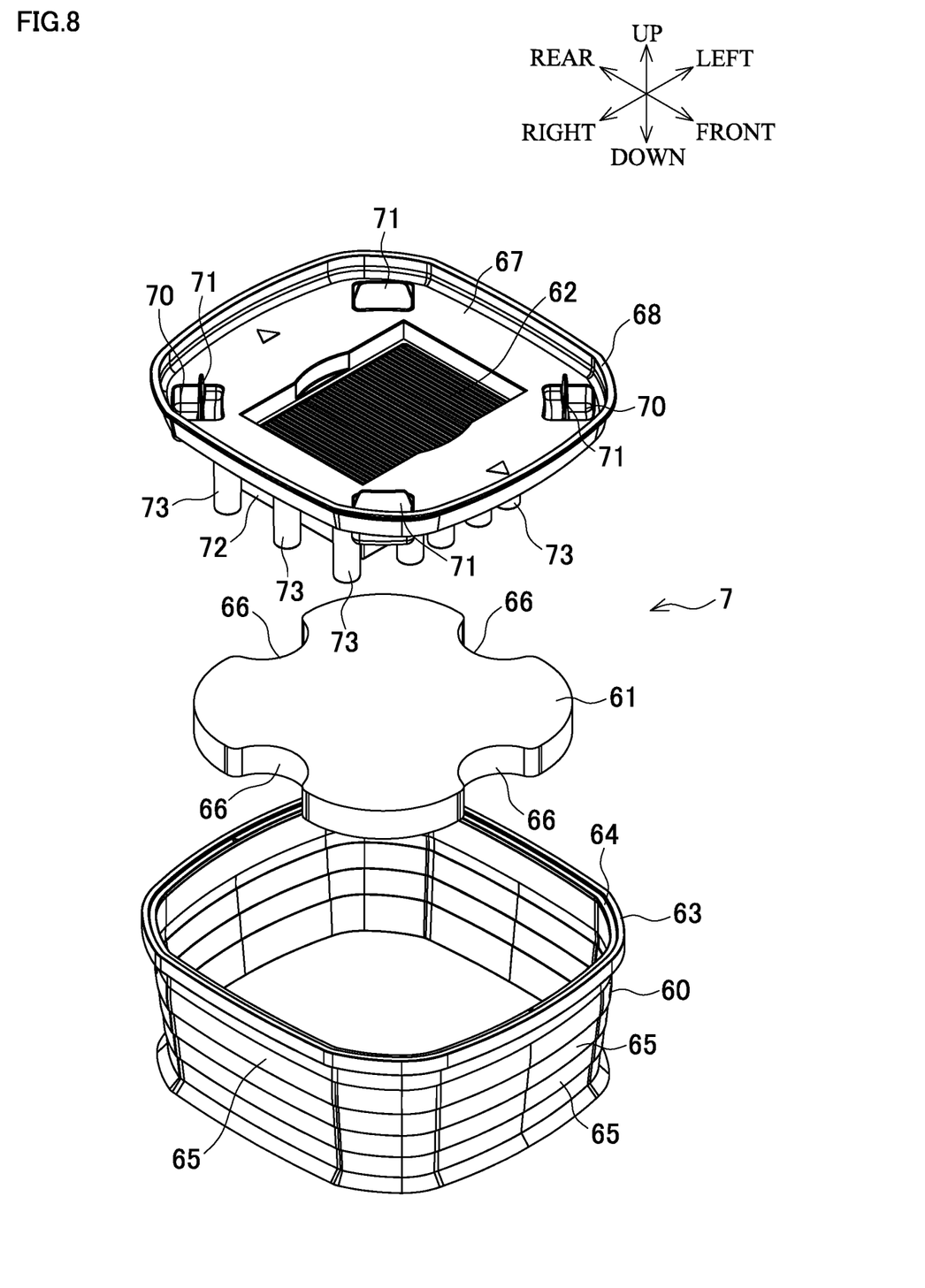
FIG. 8 is a perspective view of a filter assembly.

As illustrated in FIG. 8, the filter assembly 7 is constituted of a pre-filter 60 locked to the opening of the tank 2, a damper 61 housed in the pre-filter 60, and a main filter 62 housed in the pre-filter 60.

First, the pre-filter 60 is a quadrilateral bag made of fiber whose opening is fixed to a frame 63 with an approximately square shape in plan view locked to an opening at the top surface of the tank 2 and has a stepped portion 64 across the entire circumference on the upper inner circumference of the frame 63.

Figure 9A:
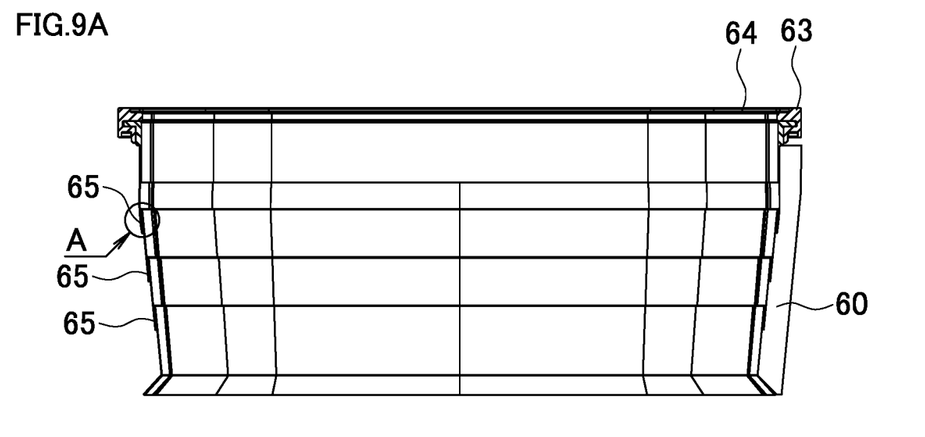
FIG. 9A is a center vertical cross-sectional view of a pre-filter.
Figure 9B:
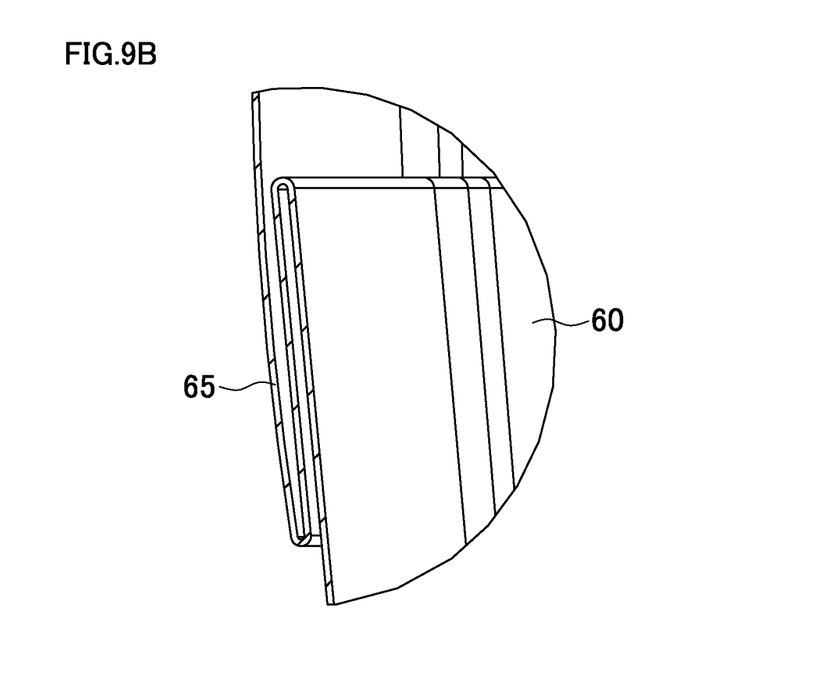
FIG. 9B is an enlarged view of a part A in FIG. 9A.

As illustrated in FIGS. 9A and 9B, in the pre-filter 60, pleat portions 65, which are folded across the entire circumference at a predetermined width in the vertical direction, are formed into a plurality of tiers at predetermined intervals in the vertical direction. Further, the pleat portions 65 are each sewn in the vertical direction at a plurality of positions at predetermined intervals in a circumferential direction. Accordingly, the pre-filter 60 is in the folded state where the shape of the respective pleat portions 65 is maintained.

Figure 10:
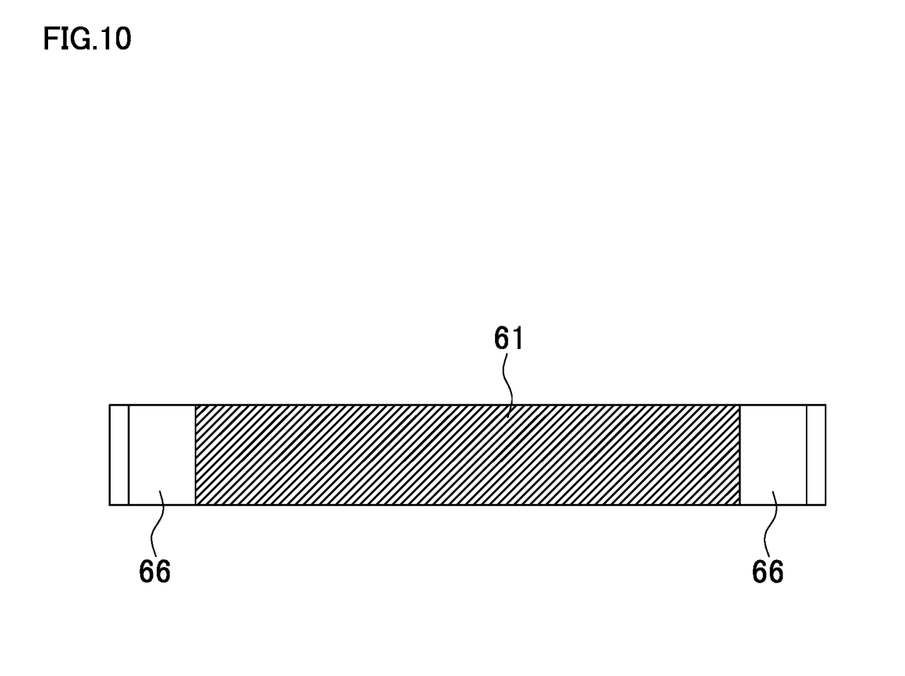
FIG. 10 is a center vertical cross-sectional view of a damper.

As illustrated in FIG. 10, the damper 61 has a plate-shaped body made of sponge having a predetermined thickness and an approximately square-shaped outer shape in plan view matching the bottom surface shape of the pre-filter 60. Depressed relief portions 66 are formed at the center of each side at the outer circumference. These depressed relief portions 66 are provided to avoid interference by the guide pipe 11 by fitting the depressed relief portions 66 to the guide pipe 11, which projects to the inside of the tank 2 when housed inside the tank 2. The reason that the depressed relief portions 66 are disposed at the four sides is to eliminate directionality (directions of the front, the rear, the right, and the left) when the damper 61 is housed.

Figure 11A:
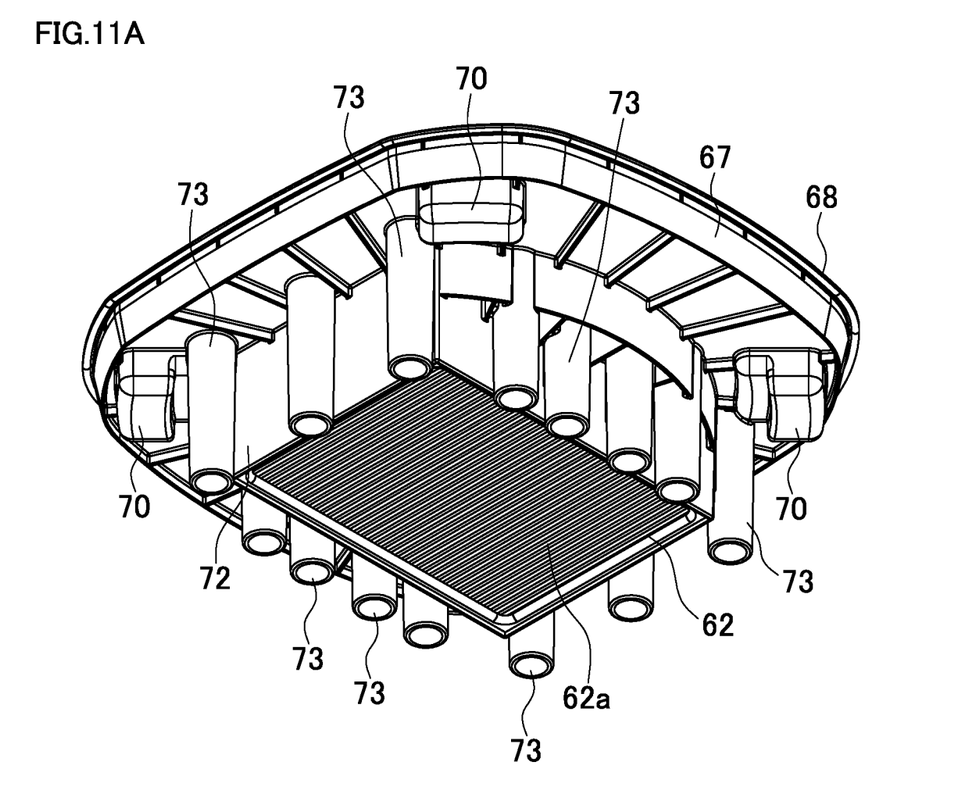
FIG. 11A is a perspective view from a lower side of a holder.
Figure 11B:
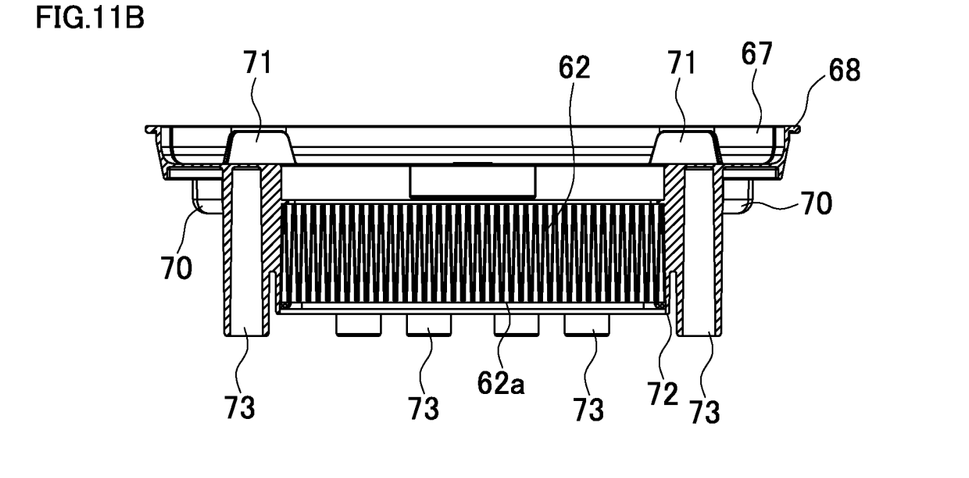
FIG. 11B is the center vertical cross-sectional view.

The main filter 62 is held at the center of a dish-shaped holder 67 fitted to the frame 63 of the pre-filter 60 from the inside. As illustrated in FIGS. 11A and 11B, the holder 67 includes a flange 68 engaged with the stepped portion 64 of the frame 63 on the outer circumference. The flange 68 includes receiving depressed portions 70, which receive four bosses 69 (FIG. 6B), which are disposed downward from the lower surface of the lower cowling 13, at the inner four corners. Ribs 71, which abut on the insides of the bosses 69, are disposed upright on the respective receiving depressed portions 70.

A tubular filter holder 72 having a rectangular shape in plan view is formed at the center of the holder 67. The main filter 62 is made of paper and is laterally held in the filter holder 72 in a state being folded multiple times in the right-left direction, and a lower filter surface 62a is exposed at a position slightly upward with respect to the lower surface of the filter holder 72. With this state, the entire shape of the main filter 62 is a plate shape rectangular in plan view where the right-left direction (the longitudinal direction) is longer than the vertical direction (the shorter direction).

On the lower surface of the holder 67 and outside of the filter holder 72, a plurality of tubular restricting bosses 73 are disposed upright surrounding the filter holder 72. These restricting bosses 73 are formed to have a length such that the distal ends project downward below the lower surface of the filter holder 72.

With the dust collector 1 configured as described above, the filter assembly 7, in which the damper 61 is housed at the inner bottom surface of the pre-filter 60 and further the holder 67 is fitted is locked to the upper end opening of the tank 2. In this state, the main body 3 is placed and, as described above, the right and left latches 16 are locked to the lock flange 12 of the tank 2. Then, the tank 2 is joined to the main body 3 with the filter assembly 7 sandwiched. In this state, as illustrated in FIG. 1, the filter assembly 7 is suspended and supported in the tank 2 with the pre-filter 60 maintaining the shape of the respective pleat portions 65. At this time, the damper 61 is positioned between the restricting bosses 73 of the holder 67 and the inner bottom surface of the pre-filter 60.

When the main power supply switch 31 is operated to the ON side from this state and the pressing operation is performed on the switch plate 34, the motor 5 is driven to rotate the output shaft 21 and the suction fan 6. Therefore, suctioning force is generated at the suction port 26 and the suction opening 8. The external air suctioned from the nozzle via the hose (not illustrated) coupled to the suction opening 8 enters from the suction opening 8 into the tank 2, passes through the pre-filter 60 and passes through the main filter 62 from the filter surface 62a via the damper 61. Then, the external air enters from the suction port 26 into the main body 3, passes through the discharge path 27 via the suction fan 6, and is discharged outside.

Figure 12:
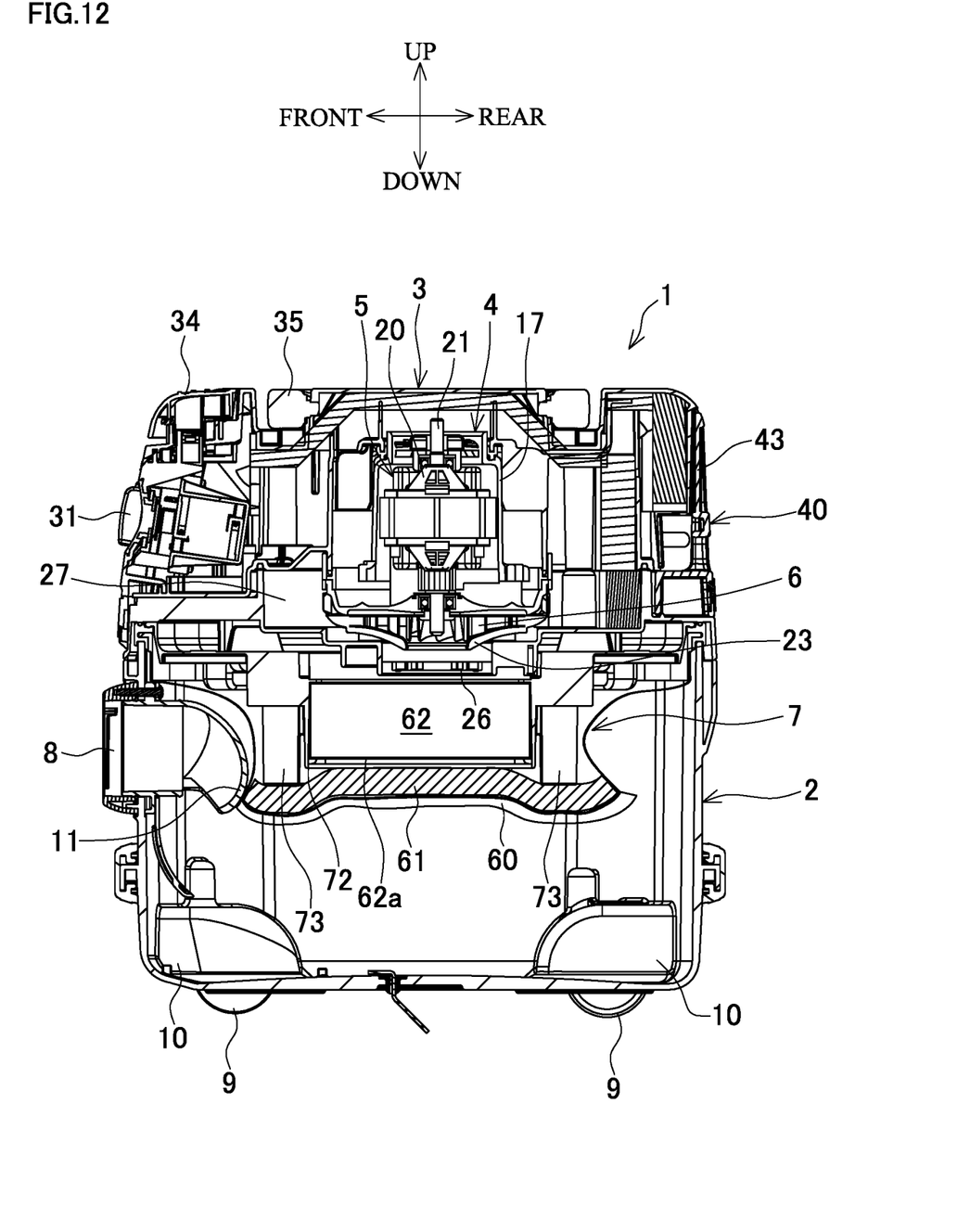
FIG. 12 is a center vertical cross-sectional view of the dust collector in operation.

As illustrated in FIG. 12, in the filter assembly 7 in the tank 2 at this time, the damper 61 contracts toward the filter surface 62a and the pre-filter 60 also contracts by the suctioning force at the filter surface 62a.

In this state, the dust suctioned into the tank 2 together with the external air is first captured by the pre-filter 60 and is accumulated in the tank 2, and the fine dust passing through the pre-filter 60 is captured by the damper 61 or is captured by the main filter 62.

Thus, even if the damper 61 contracts toward the filter surface 62a, since the filter holder 72 and the restricting bosses 73 project downward with respect to the damper 61 at the peripheral area of the filter surface 62a, the close contact between the damper 61 and the filter surface 62a is blocked and a space between the damper 61 and the filter surface 62a is secured. Additionally, even if the pre-filter 60 contracts, the restricting bosses 73 block the close contact with the filter holder 72. Accordingly, the contraction of the pre-filter 60 and the damper 61 does not affect the suctioning force.

When the pressing operation is performed on the switch plate 34 to stop the driving of the motor 5, the suctioning force at the filter surface 62a is lost. Therefore, the damper 61 returns to the original plate-shaped body by the elastic force. Since this return presses and expands the external pre-filter 60 from the inside and the pre-filter 60 returns to the original shape, the dust accumulated at the surface of the pre-filter 60 is removed from the pre-filter 60 and falls in the tank 2. The dust accumulated to the damper 61 is also removed from the damper 61 and falls in the pre-filter 60.

In the case where the hose coupled to the suction opening 8 is coupled to the electric power tool such as the circular saw and the power supply cord of this electric power tool is coupled to the coordinating electric outlet 33, by a coordinating mechanism of a controller (not illustrated) disposed inside the main body 3, even if the pressing operation of the switch plate 34 is not performed, the motor 5 turns ON/OFF in conjunction with the driving and the stop of the electric power tool. The dust collection action is identical.

Thus, with the dust collector 1 with the configuration, the main filter 62 has the plate shape disposed laterally. Since this configuration decreases the volume that the main filter 62 including the holder 67 occupies in the tank 2, the amount of collecting dust in the tank 2 can be secured. Accordingly, the tank 2 does not need to be larger in the vertical direction to secure the amount of collecting dust, thereby ensuring the entire top-to-bottom dimension compact.

Especially here, since the main filter 62 is held to the holder 67 supported inside the tank 2 such that the entire main filter 62 has the plate shape in the state of being folded multiple times in the right-left direction, the main filter 62 can secure a filter area required as the lateral plate shape.

The damper 61, which elastically deforms by the contraction of the pre-filter 60 when the external air is suctioned from the suction opening 8, is disposed between the pre-filter 60 and the main filter 62. Accordingly, in association with the elastic recovery of the damper 61 after the operation stop, the pre-filter 60 is pressed and expanded, thus ensuring providing a dust falling action. Especially, since the damper 61 has the plate shape disposed laterally, even if the damper 61 is disposed, the dimension in the vertical direction can be reduced.

Furthermore, damper restricting means (the filter holder 72 and the restricting bosses 73), which restricts the close contact of the damper 61 with the main filter 62 when the damper 61 elastically deforms, is disposed. Therefore, even when the damper 61 is disposed, the space between the damper 61 and the main filter 62 can be secured, and it is possible to maintain filter performance of the main filter 62.

Additionally, pre-filter restricting means (the restricting bosses 73), which restricts the close contact of the pre-filter 60 with the main filter 62 when the external air is suctioned from the suction opening 8, is disposed. Therefore, the space between the pre-filter 60 and the main filter 62 can also be secured. Especially here, since the restricting bosses 73 double as the damper restricting means and the pre-filter restricting means, a rational configuration where the shape of the holder 67 does not become complicated is achieved.

Since the filter holder 72 and the restricting bosses 73 are disposed on the holder 67 to support the main filter 62, the support of the main filter 62 by the holder 67 and the securement of the space are achieved simultaneously.

Meanwhile, with the dust collector 1 of the configuration, since the pre-filter 60 is made of fiber suspended and supported in the state of being folded in the vertical direction, the volume of the pre-filter 60 occupying the inside of the tank 2 decreases, thereby ensuring securing the amount of collecting dust inside the tank 2. Accordingly, there is no need to vertically enlarge the tank 2 to secure the amount of collecting dust, and the entire top-to-bottom dimension can be compact. Especially, the pre-filter 60 is folded in the vertical direction and the height in the vertical direction is reduced. This configuration allows securing the necessary filter area and even if the amount of collecting dust in the tank 2 increases, the pre-filter 60 does not contact the dust and the pre-filter 60 is not buried in the dust. Accordingly, the filter performance of the pre-filter 60 can be preferably maintained.

Especially here, in the pre-filter 60, the pleat portions 65 are formed into the plurality of tiers in the vertical direction and the respective pleat portions 65 are partially fixed to maintain the folded state. Therefore, the suspended support state in the folded state can be easily obtained.

While, in the configuration, the main filter has the rectangular shape in plan view, the shape may be another shape such as a square shape and a circular shape in plan view and the plate shape may be a plate shape made of a porous body such as sponge, not limited to the paper. The plate shape may have slight unevenness and change in dimension and has no inconvenience even with a plurality of main filters. The filter surface is not limited to only the lower surface but a part of or all of the side surfaces adjacent to the lower surface can be configured as the filter surfaces.

While, in the configuration, the main filter is horizontally supported, even if the main filter is supported slightly inclined with respect to the horizontal direction, the volume occupying the inside of the tank can be reduced. In this case, it is preferable to set the horizontal direction with the inclined posture (the dimension in the horizontal direction from one outermost position to the other outermost position) so as to become longer than the dimension in the vertical direction (the dimension in the vertical direction from the uppermost position to the lowest position).

Furthermore, the shape of the damper is also not limited to the configuration. The number and the shape of the depressed relief portion may be changed, the shape of the damper itself may be changed (for example, unevenness is provided on the surface and the thickness is changed between the center and the outer circumference), or the plurality of dampers may be disposed.

The shapes of the filter holder and the restricting bosses serving as the damper restricting means are also appropriately changeable. For example, the height of the restricting boss may be changed and the restricting boss does not have the boss shape but may be disposed upright on the peripheral area of the filter holder as a plate-shaped restricting rib. Alternatively, it is possible to form the lower end of the filter holder longer than the filter surface further downward and form a plurality of cutouts at the lower edge without disposing the restricting bosses and the ribs. Furthermore, not the entire damper but the outer circumference part may be restricted so as not to be in close contact with the main filter.

While the restricting bosses also serves as the pre-filter restricting means in the configuration, for example, the pre-filter restricting means can be configured separately from the damper restricting means by, for example, disposing the ribs upright on the outside of the restricting bosses.

With the configuration of the pre-filter, the width and the number of the pleat portion are appropriately changeable, and the pleat portions may be fixed with metal fitting or by bonding, not the sewing. There is no inconvenience that the pleat portions are formed also at the bottom surface, not only limited to the outer circumference.

The dust collector itself is also not limited to the configuration, and the disclosure is also applicable to configurations, for example, where the caster and the hook plate are omitted, the coordinating electric outlet is omitted, and a battery (for example, a battery pack for electric power tool) is mounted as the power supply, not a commercial power supply.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A dust collector comprising:
a tank including a suction opening;
a main body fixed to an upper portion of the tank;
a suction fan disposed at the main body, the suction fan being rotated by a motor;
a flexible pre-filter housed in the tank at a lower side of the main body, the pre-filter being positioned at an upstream side of external air suctioned from the suction opening;
a main filter positioned at a downstream side of the pre-filter;
a damper disposed between the pre-filter and the main filter, wherein the damper contracts due to contraction of the pre-filter when the external air is suctioned from the suction opening; and
a damper restricting unit that restricts at least a partial close contact of the damper with the main filter when the damper elastically deforms, wherein
the main filter has an overall plate shape that is disposed laterally,
the damper restricting unit is disposed on a holder, the holder supporting the main filter,
the damper restricting unit is a tubular filter holder, the tubular filter holder being formed on the holder to hold the main filter, the tubular filter holder projecting downward below a lower filter surface of the main filter, and
the damper restricting unit further includes a plurality of restricting bosses, the plurality of restricting bosses projecting downward below a lower filter surface of the main filter from a lower surface of the holder at positions surrounding the main filter.

2. The dust collector according to claim 1, wherein the main filter is held by the holder which is supported inside the tank such that the entire main filter has a plate shape in a state of being folded multiple times in a predetermined direction.

3. The dust collector according to claim 1, wherein the damper has a plate shape disposed laterally.

4. A dust collector comprising:
a tank including a suction opening;
a main body fixed to an upper portion of the tank;
a suction fan disposed at the main body, the suction fan being rotated by a motor;
a flexible pre-filter housed in the tank at a lower side of the main body, the pre-filter being positioned at an upstream side of external air suctioned from the suction opening;
a main filter positioned at a downstream side of the pre-filter,
a pre-filter restricting unit that restricts a close contact of the pre-filter with the main filter when the external air is suctioned from the suction opening, and
a damper between the pre-filter and the main filter, wherein
the damper contracts due to contraction of the pre-filter,
the main filter has an overall plate shape that is disposed laterally,
the pre-filter restricting unit is disposed on a holder, the holder supporting the main filter,
the pre-filter restricting unit is a plurality of restricting bosses in an array outside a periphery of the main filter, in a plan view facing the lower filter surface, with each of the restricting bosses projecting downward below a lower filter surface of the main filter from a lower surface of the holder.

5. The dust collector according to claim 1, wherein:
the main filter has a plate shape disposed laterally, and
the pre-filter is made of fiber where pleat portions are formed into a plurality of tiers in a vertical direction on an outer circumference, the respective pleat portions are partially fixed so that the pre-filter is suspended and supported in a state of being folded so that adjacent layers of material extend in the vertical direction.

6. The dust collector according to claim 5, wherein the pleat portions are each sewn in the vertical direction at a plurality of positions at a predetermined interval in a circumferential direction.

7. The dust collector according to claim 5, wherein the pre-filter is a bag whose opening is fixed to a frame, the frame configured to lock to an opening at a top surface of the tank.

8. The dust collector according to claim 2, wherein the main filter is made of a paper.

9. The dust collector according to claim 1, wherein the damper is made from a compressible material.

10. The dust collector according to claim 1, wherein the damper is configured to capture dust.

11. The dust collector according to claim 1, wherein the damper extends continuously across an area corresponding to the lower filter surface.

* * * * *